No. 655,853. Patented Aug. 14, 1900.
P. J. COLLINS.
MOTOR VEHICLE.
(Application filed Feb. 15, 1900.)

(No Model.) 3 Sheets—Sheet 1.

Witnesses
Jas E Hutchinson
C. W. Clement

Inventor
Patrick J. Collins
By Watson & Watson
Attorneys

THE NORRIS PETERS CO., PHOTO-LITHO., WASHINGTON, D. C.

No. 655,853. Patented Aug. 14, 1900.
P. J. COLLINS.
MOTOR VEHICLE.
(Application filed Feb. 15, 1900.)
(No Model.) 3 Sheets—Sheet 2.
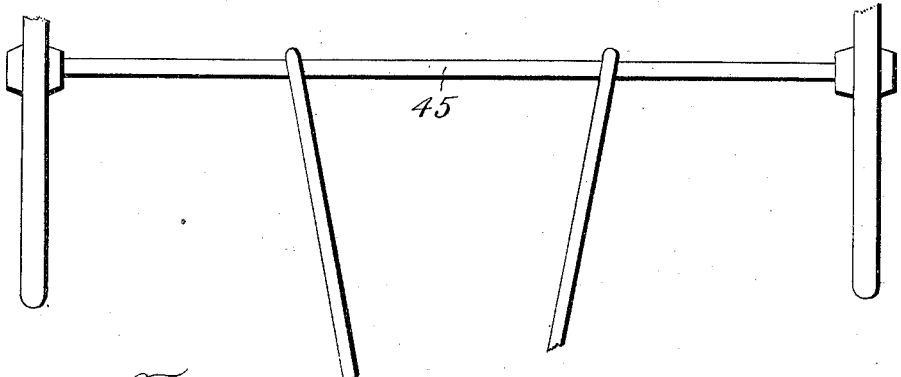
Fig. 3.
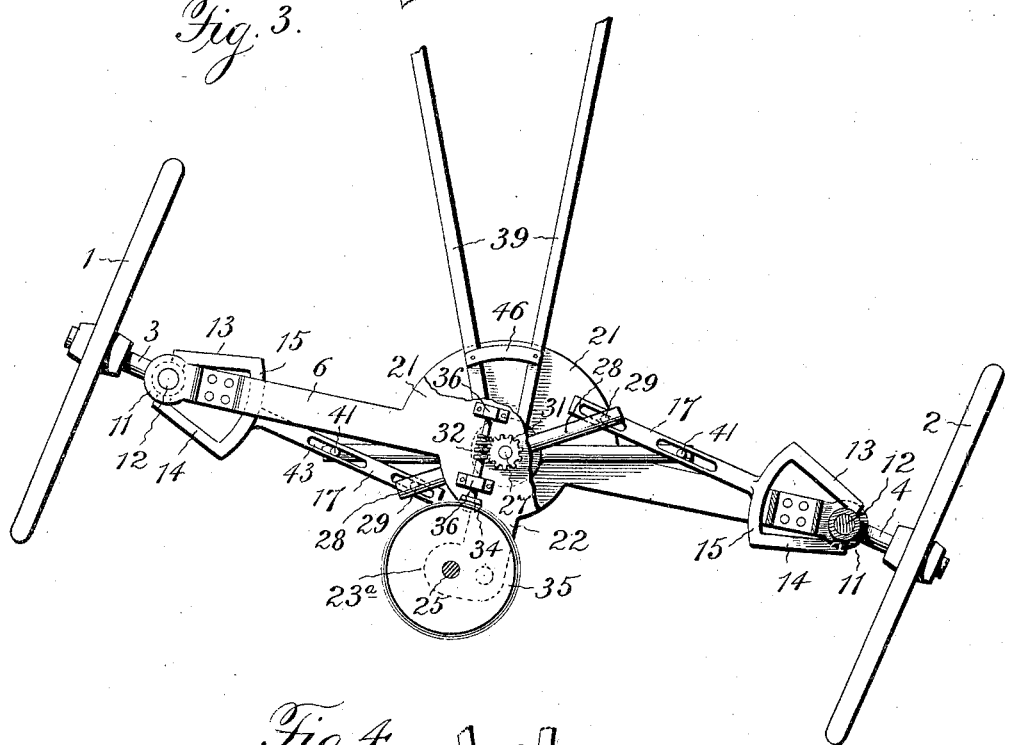
Fig. 4.
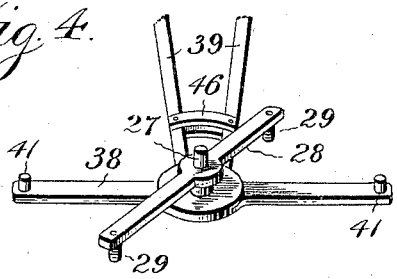
Witnesses
Jas E Hutchinson
C. W. Clement
Inventor
Patrick J. Collins
By Watson & Watson
Attorneys No. 655,853. Patented Aug. 14, 1900.
P. J. COLLINS.
MOTOR VEHICLE.
(Application filed Feb. 15, 1900.)
(No Model.) 3 Sheets—Sheet 3.
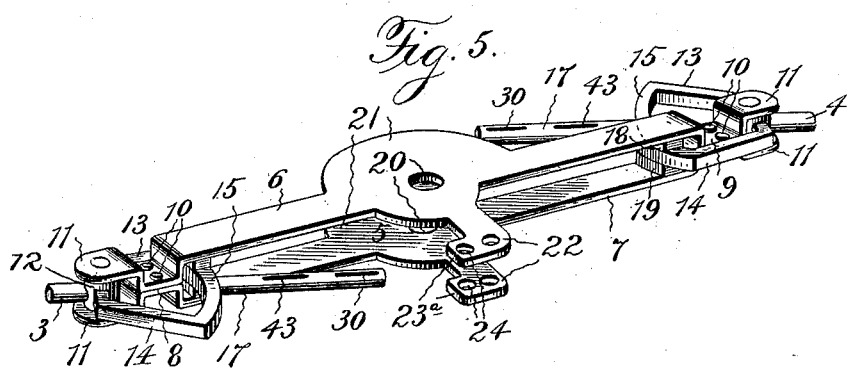
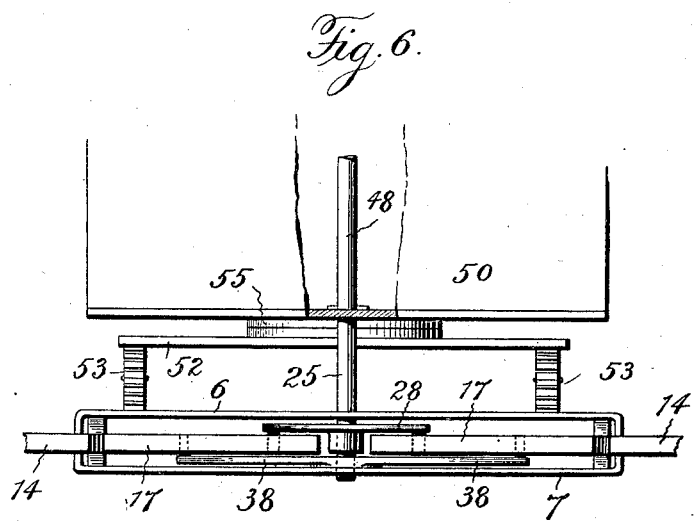

UNITED STATES PATENT OFFICE.

PATRICK J. COLLINS, OF SCRANTON, PENNSYLVANIA, ASSIGNOR TO THE COLLINS ELECTRIC VEHICLE COMPANY, OF SAME PLACE.

MOTOR-VEHICLE.

SPECIFICATION forming part of Letters Patent No. 655,853, dated August 14, 1900.

Application filed February 15, 1900. Serial No. 5,282. (No model.)

*To all whom it may concern:*

Be it known that I, PATRICK J. COLLINS, a citizen of the United States, residing at Scranton, in the county of Lackawanna and State of Pennsylvania, have invented certain new and useful Improvements in Motor-Vehicles, of which the following is a specification.

My invention relates to improvements in the construction of the steering-gear of motor-vehicles, the purpose of the invention being to facilitate the turning of the vehicle to prevent the accidental turning of the wheels and axles when an obstacle upon the road is encountered, to prevent the transmission of shocks and strains to the arm of the operator, and to lighten and improve the construction of the casing which supports the axles.

Figure 1:
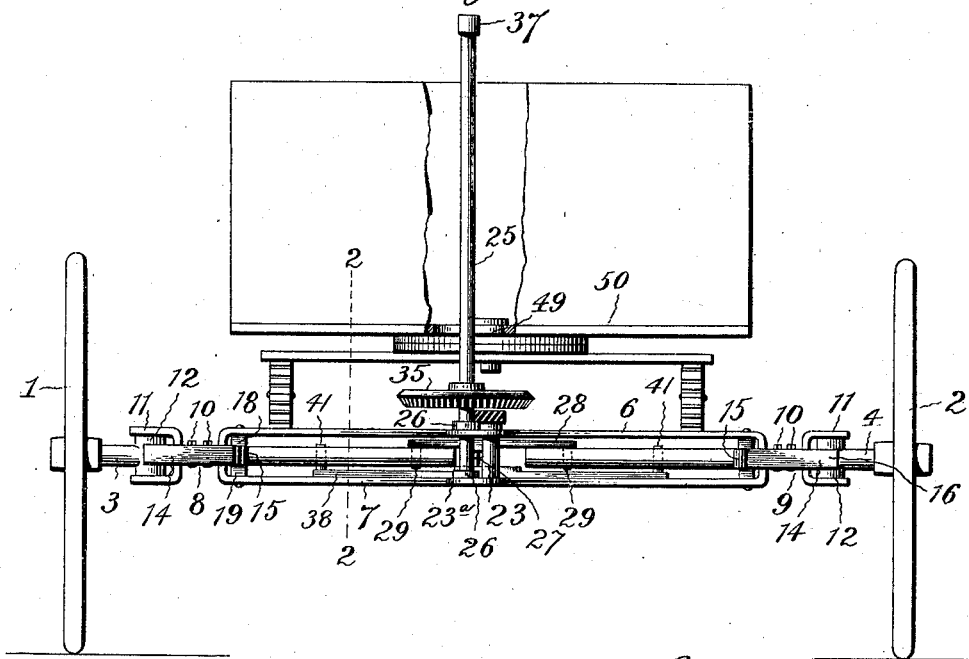
Figure 2:
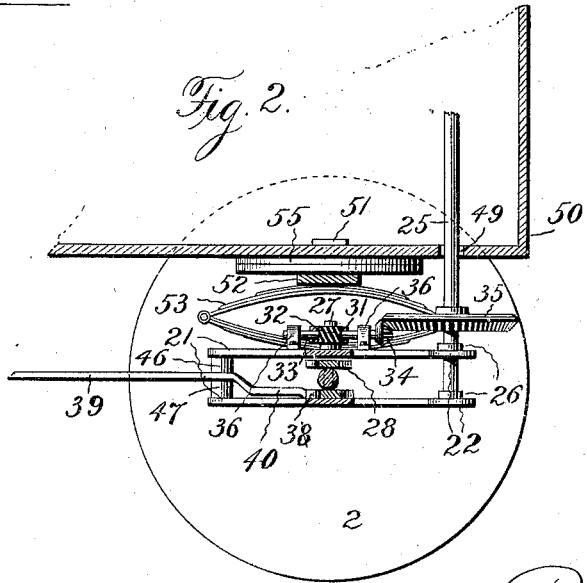

In the accompanying drawings, Figure 1 is a view of the front of a vehicle, partly broken away, showing my improvements. Fig. 2 is a section on the line 2 2 of Fig. 1. Fig. 3 is a plan view, partly broken away, of the running-gear of a vehicle. Fig. 4 is a perspective view of a part of the reach and the steering-arm. Fig. 5 is a perspective view of the axle-casing and axles; and Fig. 6 is a front view of a vehicle, partly broken away, the worm-gearing for turning the axles and axle-casing being omitted and said parts being controlled directly by the steering-head.

Referring to Figs. 1 to 5, inclusive, of the drawings, 1 and 2 indicate the forward or steering wheels of a motor-vehicle, which are journaled upon half-axles 3 and 4, respectively, said axles being pivoted in the opposite ends of an axle-casing. The axle-casing consists of upper and lower parallel plates or bars 6 and 7, which are similarly constructed throughout. Each plate has near its ends two offset portions 8 and 9, meeting corresponding portions upon the opposite plates. The plates are united by bolts 10 passing through these portions. As thus constructed, the plates are separated from each other on either side of the offset portions, making a sort of casing within which the axles move and are supported. The ends 11 of each bar are rounding or circular in form and are provided with central openings adapted to receive the ends of the axle-trunnions 12. Each axle, as shown more clearly in Figs. 3 and 5, has a trunnion 12, formed integrally therewith, and also a frame consisting of a pair of divergent arms 13 and 14, united to the opposite sides of said trunnion and to a segmental guide-piece 15. Said frame forms a a part of the axle, the forward portion 16 of the axle being united to the trunnion 12 and the rear portion being united to the center of the segment 15. Preferably these parts are made in one piece, although they may be made separately and afterward united. When the bars 6 and 7 are brought together, the ends of the trunnions fit within the openings in the end pieces 11 and the segments 15 and rear ends of the axles are free to move laterally within the casing. Guide-blocks 18 and 19 are arranged within the casing to form bearings for the guide-pieces 15. The axles are thus supported and steadied by the trunnions and the guide-pieces 15. The bars are each formed with a central opening 20, said openings registering with each other, and each bar is formed with a rearwardly-projecting arcuate portion 21 and a forwardly-projecting arm 22. The arms 22 are connected near their ends by a stud 23, as shown in Fig. 1, said stud tending to brace the casing centrally. The ends 23ª of the arms 22 project at right angles to the bodies of the arms, and said ends are formed with registering openings 24, adapted to receive the steering-head 25, said head being supported by means of suitable collars 26, resting upon the arms. A shaft 27 is revolubly mounted in the openings 20, and said shaft carries an arm or fork 28, having pins 29 upon its opposite ends, which extend through longitudinal slots 30 at the inner ends of the half-axles. When the shaft 27 is turned, the half-axles are turned about their pivotal points by reason of the engagement of the pins 29 with the slots 30, as shown in Fig. 3. The shaft 27 is operated through the medium of a worm-wheel 31, rigidly secured to said shaft, and a worm 32 upon a worm-shaft 33, the latter shaft being operated by means of a bevel-pinion 34, secured to said shaft, and a large bevel-gear 35, keyed to the steering-head 25. The steering-head 25 is movable in a curved slot 49 in the floor of the carriage-body 50. The latter is pivotally connected to the casing by a bolt 51, passing through a support 52, which is carried by springs 53, secured to the casing, a fifth-wheel 55 being interposed between the support and body. The worm-shaft is mounted in suitable bearings 36, arranged upon the upper side of the axle-casing. The relative diameters of the bevel-gears and the pitch of the worm-wheel and worm are such that the axles will be turned as far as is desirable when the steering-handle 37 is given a quarter-turn. It will be seen that the movement of the axles through the medium of the multiplying-gearing and worm-wheel may be easily accomplished by the operator, as the worm-wheel is readily moved through the leverage exerted upon it by the worm. When, however, either of the steering-wheels strikes an object which would tend to throw the wheels out of line, the shock is transmitted through the axle to the shaft 27 and worm-wheel 31, and, owing to the fact that the leverage exerted by the worm-wheel upon the worm is very small, the force of the blow is taken up between said parts instead of being transmitted to the arm of the operator, and the steering-wheels are thus locked against being turned by obstacles upon the road. The guiding and controlling of the vehicle therefore becomes less burdensome upon the operator.

By means of the mechanism above described the axles are turned relatively to the casing. In order to facilitate the turning of the vehicle, I also arrange to move the axle-casing relatively to the carriage-body simultaneously with the movement of the axles in order to give a further movement of the wheels without increasing the throw of the operating-handle 37. For this purpose I provide a cross-piece 38 upon the reach 39, said cross-piece being arranged at right angles to the reach and projecting in opposite directions from the head 40 of the reach, the latter being journaled upon the shaft 27. Pins 41 are arranged upon said cross-piece at points equidistant from said shaft, and said pins project upwardly through longitudinal slots 43 in the parts 17 of the axles between the guide-pieces 15 and slots 30. The pins 41, being connected to the reach, are maintained in fixed relation to the rear axle 45 and the line of the carriage-body, and these pins form bearings upon which the shafts are fulcrumed when the steering-arm 28 is moved to turn the axles. When the vehicle is moving in a straight line, the axles, steering-arm 28, and the cross-piece 38 will extend parallel with each other within the axle-casing. When, however, it is desired to turn the vehicle, the movement of the handle 37 causes the arm 28 to turn, thereby forcing the inner ends of the axles in opposite directions, as shown in Fig. 3. This in turn causes the axles to fulcrum upon the fixed pins 41, which are in sliding engagement therewith, and the axles thus act as levers to turn the casing relatively to the body in the direction which it is desired to turn, as shown in said figure.

Other forms of fixed bearings may be used instead of the pins 41, and they may be attached to the reach or vehicle-body in sliding engagement with the axles.

It will be obvious that if the steering power were applied the axle-support instead of to the axles directly the latter, being fulcrumed upon the fixed bearings, would turn about their pivotal points in the same manner, the axles and support turning together and relatively to each other.

Guide-blocks 46 and 47 are secured to the upper and lower sides of the reach, and said blocks bear against the segmental portions 21 of the axle-support in all positions of the latter. This arrangement prevents tilting of the support.

I might obviously turn the axles directly by means of the steering-head, as shown in Fig. 6, instead of employing worm-gearing; but I prefer the gearing for reasons stated. In Fig. 6 the steering-head 48 extends through the center of the casing, and the steering-arm 38 is connected directly to said head.

Having described my invention, what I claim, and desire to secure by Letters Patent of the United States, is—

1. In a motor-vehicle, the combination with an axle casing or support consisting of two parallel bars united by offset portions near their ends, of a pair of axles journaled in the ends of said casing, each axle having arms extending around the offset portions of the casing, substantially as described.

2. The combination with the axle-casing consisting of two parallel bars united by offset portions near their ends, of a pair of axles pivoted in the opposite ends of said casing, each axle having formed integrally therewith, a trunnion journaled in the opposing bars of the casing and a frame consisting of arms which extend around the offset portions, substantially as described.

3. In a motor-vehicle, the combination with an axle-casing consisting of two parallel bars united by offset portions near their ends, of a pair of axles journaled in the ends of said casing, each axle having a hollow frame interposed between its outer and inner ends, said frame consisting of the arms 13 and 14 and segmental guide-piece 15, and guide-blocks within the casing for said guide-piece substantially as described.

4. In a motor-vehicle, the combination with the body and an axle casing or support in pivotal relation thereto, of axles pivoted to said support, and means controlled by a single steering-lever for turning the axles about their pivotal points and for simultaneously turning the support relatively to the body.

5. In a motor-vehicle, the combination with the body and an axle casing or support in pivotal relation thereto, of axles pivoted to said support, fixed bearings against which said axles are fulcrumed, and means for turning said axles about their pivotal points.

6. In a motor-vehicle, the combination with the body and an axle casing or support in pivotal relation thereto, of axles pivoted to said support, fixed bearings against which said axles are fulcrumed in sliding engagement, and means for turning said axles about their pivotal points.

7. In a motor-vehicle, the combination with the body and an axle casing or support in pivotal relation thereto, of axles pivoted in the ends of said support, means for turning said axles about their pivotal points, and fixed bearings arranged between the inner ends of said axles and their pivotal points against which said axles are fulcrumed.

8. In a motor-vehicle, the combination with a reach secured to the rear axle of the vehicle, of an axle-support pivoted to the forward end of said reach, bearings arranged in fixed relation to said reach on either side of its pivotal point, axles pivoted in the ends of said support and fulcrumed against said bearings, and means for turning said axles about their pivotal points.

9. In a motor-vehicle, the combination with a reach secured to the rear axle of the vehicle, of an axle-support pivoted to the forward end of said reach, a cross-piece carried by said reach, and bearings arranged upon said cross-piece on either side of the pivotal point of the reach, axles pivoted in the ends of said support and fulcrumed against said bearings, and means for turning said axles about their pivotal points.

10. In a motor-vehicle, the combination with the body and an axle casing or support in pivotal relation thereto, of axles pivoted to said support, fixed bearings against which said axles are fulcrumed, and means for turning said axles about their pivotal points consisting of a shaft journaled vertically in said support, an arm fixed to said shaft and having its opposite ends in engagement with the inner ends of the axles, a worm-wheel upon said shaft, a worm engaging said wheel, a steering-head and gearing interposed between said head and worm for turning the latter.

11. In a motor-vehicle, the combination with a reach secured to the rear axle of the vehicle, of an axle-support pivoted to the forward end of said reach, a cross-piece carried by said reach, and pins arranged upon said cross-piece on either side of the pivotal point of the reach, axles pivoted in the ends of said support and having slots into which said pins extend, a steering-arm also having pins engaging slots in the axles, and means for turning said steering-arm.

In testimony whereof I affix my signature in presence of two witnesses.

PATRICK J. COLLINS.

Witnesses:
ROBERT WATSON,
M. F. SANDO.